(12) United States Patent
Takahashi

(10) Patent No.: US 11,065,838 B2
(45) Date of Patent: Jul. 20, 2021

(54) SHAPED OBJECT AND SHAPED OBJECT MANUFACTURING METHOD

(71) Applicant: Casio Computer Co., Ltd., Tokyo (JP)

(72) Inventor: Hideki Takahashi, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 13 days.

(21) Appl. No.: 16/569,092

(22) Filed: Sep. 12, 2019

(65) Prior Publication Data

US 2020/0094521 A1    Mar. 26, 2020

(30) Foreign Application Priority Data

Sep. 20, 2018   (JP) .............................. JP2018-176369

(51) Int. Cl.
    *B32B 3/00*    (2006.01)
    *B32B 7/027*    (2019.01)
    *B32B 27/06*    (2006.01)

(52) U.S. Cl.
    CPC .............. *B32B 7/027* (2019.01); *B32B 27/06* (2013.01); *B32B 2310/0825* (2013.01)

(58) Field of Classification Search
    CPC .................. B32B 27/06; B32B 25/045; B32B 2310/0806
    See application file for complete search history.

(56) References Cited

U.S. PATENT DOCUMENTS

| | | | | |
|---|---|---|---|---|
| 9,579,833 B2 * | 2/2017 | Horiuchi | ............... | B29C 44/022 |
| 2017/0144339 A1 * | 5/2017 | Horiuchi | ................. | B29C 44/60 |
| 2017/0334214 A1 * | 11/2017 | Ushigome | ................ | B41M 3/06 |
| 2018/0370092 A1 * | 12/2018 | Motoyanagi | ........ | B29C 35/0272 |
| 2019/0023026 A1 * | 1/2019 | Numao | .................... | B32B 27/36 |
| 2019/0030943 A1 * | 1/2019 | Horiuchi | ............... | B44C 1/1737 |
| 2020/0023559 A1 * | 1/2020 | Takahashi | ............... | B32B 5/245 |

FOREIGN PATENT DOCUMENTS

| | | |
|---|---|---|
| JP | S57-126629 A | 8/1982 |
| JP | S64-28660 A | 1/1989 |
| JP | 2001-150812 A | 6/2001 |

* cited by examiner

*Primary Examiner* — Elizabeth E Mulvaney
(74) *Attorney, Agent, or Firm* — Seed IP Law Group LLP

(57) ABSTRACT

A shaped object includes a thermally expandable sheet including (i) a base, (ii) a thermal expansion layer disposed on a first surface of the base and including a thermally expandable material, and (iii) a thermal conversion member disposed on at least one of a second surface of the base or the thermal expansion layer, and including a thermal conversion material for conversion of electromagnetic waves into heat. The thermal conversion member further includes thermal conversion layers disposed on an entire region corresponding to an expansion region for expansion of the thermal expansion layer. At least part of one of the thermal conversion layers is disposed at a location separated from an adjacent other thermal conversion layer. Upon expansion of the thermal expansion layer, (i) the thermal expansion layer partially peels away from the thermal expansion layer in a region where the thermal conversion layer is disposed, and (ii) the thermal expansion layer also expands in a region between the one thermal conversion layer and the other thermal conversion layer.

14 Claims, 6 Drawing Sheets

SHAPED OBJECT AND SHAPED OBJECT MANUFACTURING METHOD

CROSS-REFERENCE TO RELATED APPLICATION

This application claims the benefit of Japanese Patent Application No. 2018-176369, filed on Sep. 20, 2018, the entire disclosure of which is incorporated by reference herein.

FIELD

The present disclosure relates to a shaped object and a shaped object manufacturing method that use a thermally expandable sheet that expands according to the amount of heat absorbed.

BACKGROUND

Thermally expandable sheets are known that include a thermal expansion layer containing a thermally expandable material, which foams and expands according to the amount of heat absorbed, on one surface of a base sheet. By forming a photothermal conversion layer that converts light into heat on the thermally expandable sheet and irradiating the photothermal conversion layer with light, part or all of the thermal expansion layer can be expanded. Additionally, methods are known for forming a shaped object, which includes three-dimensional unevennesses, on a thermally expandable sheet by causing the shape of a photothermal conversion layer to change (see, for example, Unexamined Japanese Patent Application Kokai Publication Nos. S64-28660 and 2001-150812).

Although conventionally a thermal conversion layer is formed in a region for expansion of the thermal expansion layer, and then the thermal expansion layer is expanded, when the thermal conversion layer is formed over an entire wide range such as the entire thermally expandable sheet, for example, upon expansion of the thermal expansion layer, a problem occurs in that the thermal expansion layer in the entire expanded region peels off of the base. This phenomenon is particularly severe when the thermal expansion layer is made to highly expand.

In consideration of the aforementioned circumstances, an objective of the present disclosure is to provide a shaped object and a shaped object manufacturing method that are capable of suppressing pealing of the entire thermal expansion layer from the base in the expanded region.

SUMMARY

The present disclosure provides a shaped object that includes a thermally expandable sheet including (i) a base, (ii) a thermal expansion layer disposed on a first surface of the base and including a thermally expandable material, and (iii) a thermal conversion member disposed on at least one of a second surface of the base or the thermal expansion layer, and including a thermal conversion material for conversion of electromagnetic waves into heat. The thermal conversion member further includes thermal conversion layers disposed on an entire region corresponding to an expansion region for expansion of the thermal expansion layer. At least part of one of the thermal conversion layers is disposed at a location separated from an adjacent other thermal conversion layer. Upon expansion of the thermal expansion layer, (i) the thermal expansion layer partially peels away from the thermal expansion layer in a region where the thermal conversion layer is disposed, and (ii) the thermal expansion layer also expands in a region between the one thermal conversion layer and the other thermal conversion layer.

The present disclosure further provides a shaped object manufacturing method including:
irradiating a thermally expandable sheet with electromagnetic waves to expand a thermal expansion layer, the thermally expandable sheet including a thermal conversion member including (i) a base, (ii) the thermal expansion layer disposed on a first surface of the base and including a thermally expandable material, and (iii) a thermal conversion material disposed on at least one of a second surface of the base or the thermal expansion layer for conversion of the electromagnetic waves to heat, the thermal conversion member further including thermal conversion layers disposed on an entire region corresponding to an expansion region for expansion of the thermal expansion layer, and at least part of one of the thermal conversion layers is disposed at a location separated from an adjacent other thermal conversion layer; and upon expansion of the thermal expansion layer, (i) partial peeling away of the thermal expansion layer from the thermal expansion layer in a region where the thermal conversion layer is disposed, and (ii) expanding also of the thermal expansion layer in a region between the one thermal conversion layer and the other thermal conversion layer.

BRIEF DESCRIPTION OF THE DRAWINGS

A more complete understanding of this application can be obtained when the following detailed description is considered in conjunction with the following drawings, in which.

DETAILED DESCRIPTION

A shaped object and a shaped object manufacturing method according to the present embodiment are described in detail with reference to drawings. In the present embodiment, as described in detail below, the shaped object is manufactured using a thermally expandable sheet on which a thermal expansion layer is provided on one surface of a base.

In the present specification, the term "shaped object" refers to a thermally expandable sheet in which shapes such as simple shapes such as convexities (protrusions) and concavities (recesses), geometrical shapes, characters, patterns, and decorations are shaped (formed) on a predetermined surface of the thermally expandable sheet. Here, the term "decorations" refers to objects that appeal to the aesthetic sense through visual and/or tactile sensation. The term "shaped (or formed)" refers to giving shape to an object to form a shaped object, and should be construed to also include concepts such as decorating and ornamenting. Moreover, although the shaped object of the present embodiment is a three-dimensional object that includes unevennesses, geometrical shapes, decorations, or the like on a predetermined surface, to distinguish this three-dimensional object from three-dimensional objects formed using a so-called 3D printer, the shaped object of the present embodiment is called a 2.5-dimensional (2.5D) object or a pseudo-three-dimensional (pseudo-3D) object. The technique used to produce the shaped object of the present embodiment is called 2.5D printing or pseudo-3D printing.

In the present disclosure, for ease of description, the surface of the thermally expandable sheet where the thermal expansion layer is provided is referred to as the front surface (front side) or the top surface, and the surface of the thermally expandable sheet where the base is provided is referred to as the back surface (back side) or the bottom side. The terms "front", "back", "top", and "bottom" should not be construed to limit the method of use of the thermally expandable sheet. That is to say, depending on the method of use of the formed thermally expandable sheet, the back surface of the thermally expandable sheet can be used as the front surface. The same is applicable to the shaped object as well.

Thermally Expandable Sheet 10

Figure 1A:
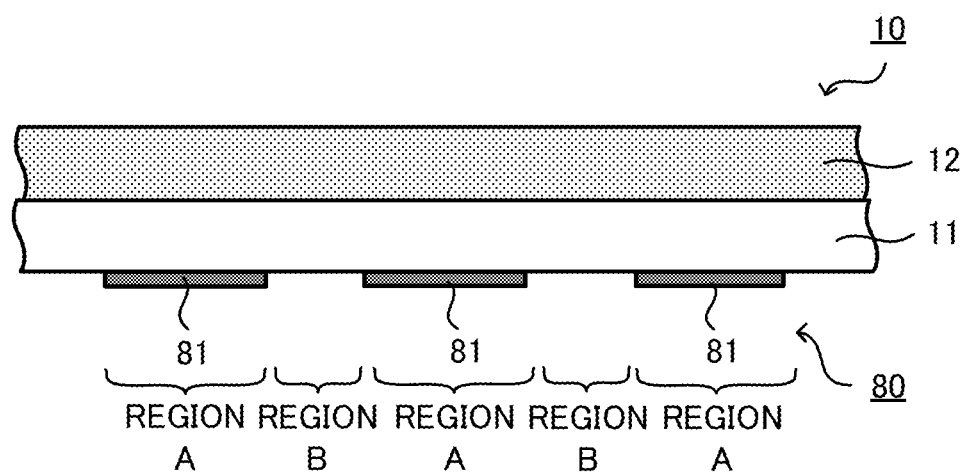
FIG. 1A is a cross-sectional view illustrating schematically a thermally expandable sheet used in the present embodiment.

As illustrated in FIG. 1, the thermally expandable sheet 10 is equipped with a base 11, a thermal expansion layer 12 provided on a first surface (the top surface illustrated in FIG. 1) of the base 11, and an electromagnetic wave thermal conversion member (referred to below as a "thermal conversion member") 80 that has electromagnetic wave thermal conversion layers (referred to below as "thermal conversion layers") 81 provided on a second surface (lower surface as illustrated in FIG. 1A) of the base 11.

The base 11 is a sheet-like member for support of components such as the thermal expansion layer 12. The base 11 is a sheet made from resin. Without particular limitation, polyolefin resins such as polyethylene (PE) and polypropylene (PP), polyethylene terephthalate (PET), polyethylene naphthalate (PEN), and polybutylene terephthalate (PBT), polyester resins, polyamide resins such as nylon, polyvinyl chloride (PVC) resins, polystyrene (PS), polyimide resins, and the like can be used as the resin. In the present embodiment, a resin sheet is preferably used as the base 11 in order to control the location of peeling of the thermal expansion layer 12 from the base 11 in the below-described manner and to allow peeling of a region of part of the thermal expansion layer 12 from the base 11.

The thermal expansion layer 12 is provided on the first surface (upper surface illustrated in FIG. 1A) of the base 11. The thermal expansion layer 12 is provided, for example, on the entire surface of the base 11. The thermal expansion layer 12 is a layer that expands greatly in accordance with a degree of heating, such as a heating temperature or a heating period, and thus has a thermally expandable material (thermally expandable microcapsules or micro-powder) dispersed in a binder. Further, the thermal expansion layer 12 is not limited to a single layer, and may have multiple layers. A freely-selected thermoplastic resin such as ethylene-vinyl acetate polymer or acrylic polymer is used as the binder of the thermal expansion layer 12. The thermal expansion layer 12 is not limited to a single layer, and may have multiple layers.

Moreover, the thermally expandable microcapsules may include inside a shell of the thermoplastic resin propane, butane, or another low boiling point substance. The shell is formed from a thermoplastic resin such as polystyrene, polyvinyl chloride, polyvinylidene chloride, polyvinyl acetate, polyacrylic acid ester, polyacrylonitrile, polybutadiene, or copolymers thereof. For example, average particle size of the thermally expandable microcapsules is about 5 to 50 μm. Upon heating of these microcapsules to a temperature greater than or equal to a thermal expansion initiation temperature, the shell formed from resin softens, the internally enclosed low boiling point substance vaporizes, and the resultant pressure expands the shell in a balloon-like manner. Depending on characteristics of the utilized microcapsules, the particle size of the microcapsules expands to about 5 times the particle size of the microcapsules prior to expansion. Further, variance occurs in the particle size of the microcapsules, and all the microcapsules do not have the same particle size.

Figure 1B:
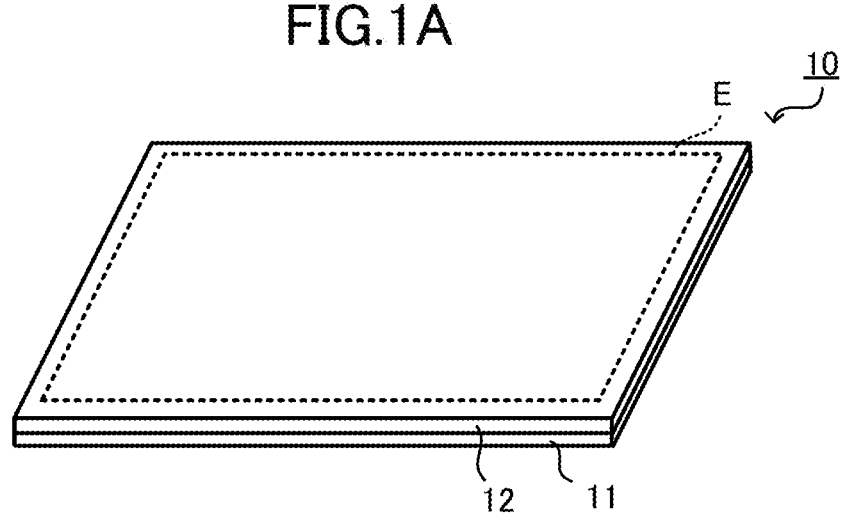
FIG. 1B is a perspective view for description of an expansion region.

In the present embodiment, the entire range of an expansion region E illustrated in FIG. 1B is irradiated with electromagnetic waves, and in the range of the expansion region E, the entire thermal expansion layer 12 is expanded and formed into an unevenness. The expansion region E may be provided over nearly the entire thermally expandable sheet 10 as illustrated in FIG. 1B, or may be provided over a portion such as half of the thermally expandable sheet 10. Although in the present embodiment the thermal expansion layer 12 is provided over the entire first surface of the base 11, alternatively, as long as the expansion region E is provided, the thermal expansion layer 12 may be provided in part of the first surface of the base 11.

Figure 1C:
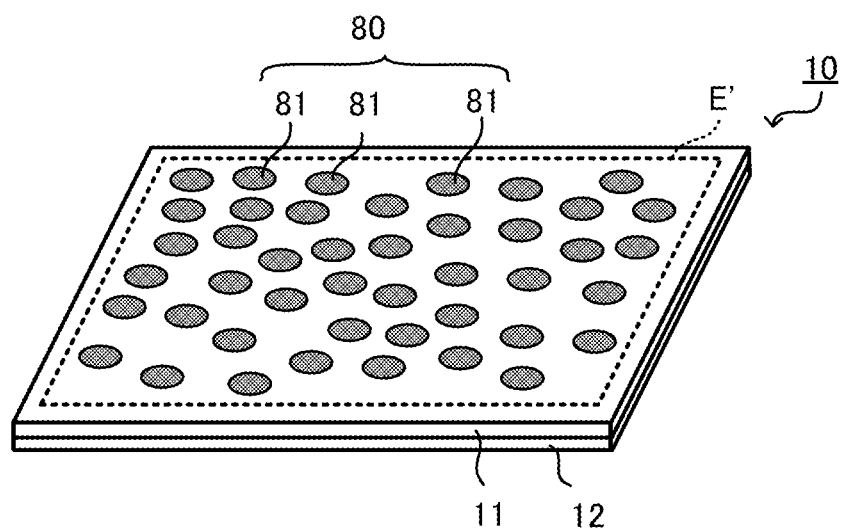
FIG. 1C is a perspective view for description of a thermal conversion member.

As illustrated in FIGS. 1A and 1C, the thermal conversion member 80 is equipped with thermal conversion layers 81 on the second surface (lower surface illustrated in FIG. 1A) of the base 11. In particular, as illustrated in FIG. 1C in the present embodiment, the thermal conversion layers 81 are dispersedly disposed on the entire second surface of the base 11, as viewed from above, within an expansion region E' (region opposing the expansion region E with the base 11 therebetween).

As illustrated in FIG. 1A, the thermal conversion layer 81 is provided on the second surface (lower surface illustrated in FIG. 1A) of the base 11. The thermal conversion layer 81 is a layer that includes the electromagnetic wave thermal conversion material, and thus generates heat due to irradiation with the electromagnetic waves so that the thermal expansion material within the thermal expansion layer 12 expands due to such heat, and the thermal expansion layer 12 swells. The thermal conversion material is a material capable of converting the electromagnetic waves to heat. Infrared absorbing agents such as cesium tungsten oxide and lanthanum hexaboride, carbon black, and the like can be used as the electromagnetic wave thermal conversion material. Moreover, the thermal conversion layer 81 is provided in a first region A of the thermally expandable sheet 10. The thermal conversion layer 81 is not provided in a second region B abutting against the first region A. In the present embodiment, the thermal conversion layer 81 is disposed over the entire expansion region E in order to allow expansion of the entire expansion region E. In the example illustrated in FIG. 1C, the thermal conversion layer 81 is dispersedly disposed over the entire region (region E' opposing the expansion region E with the base 11 therebetween) corresponding to the expansion region E occurring on the second surface of the base 11.

The thermal conversion layer 81 is formed by using a printing apparatus to print an ink that includes the thermal conversion material. A widely known printing apparatus such as an inkjet printer or an offset printer can be used as the printing apparatus. Further, although the thermal conversion layer 81 formed in this manner does not take the form of a distinct layer, in the present embodiment, the term "layer" is used for ease of description.

Figure 2A:
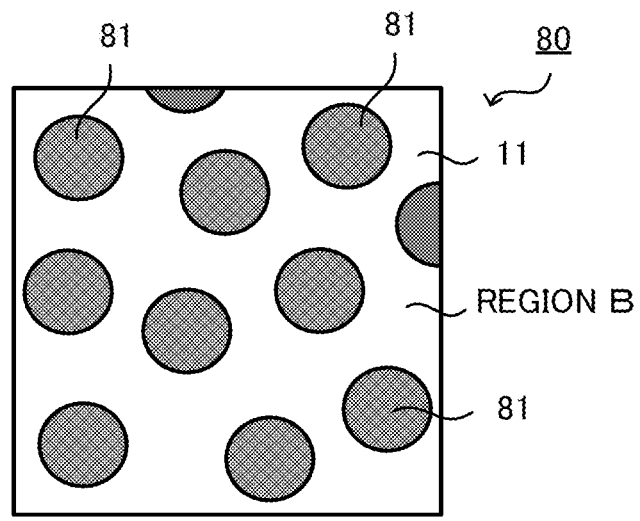
FIG. 2A is a plan view illustrating a thermal conversion layer.

The thermal conversion layers 81 are disposed on the first region A of the second surface of the base 11. Moreover, in the present embodiment, at least a part of one of the thermal conversion layers 81 is disposed at a location separated from an adjacent other thermal conversion layer 81. That is to say, in a region of at least part at the periphery of the thermal conversion layer 81, a second region B is provided that does not have the thermal conversion layer 81. For example, as illustrated in FIG. 2A, the thermal conversion layers 81 in the present embodiment are disposed separated from each other, and a region (second region B), in which the thermal conversion layer is not formed, is present at the periphery of a single thermal conversion layer 81. Further, FIG. 2A is a top view illustrating a portion of the second surface of the base 11. The meaning of the second region "in which the thermal conversion layer is not formed" includes configurations said to be substantially free of the thermal conversion layer 81, such as configurations in which an extremely small amount of the thermal conversion material is included in comparison to the thermal conversion layer 81.

In the below-described manner, a part located above the first region A within the thermal expansion region 12 is heated and swells due to heating by the heat generated from the thermal conversion layer 81, and also the part located above the second region B within the thermal expansion layer 12 is heated and swells due to effects such as transmission of heat arising in the thermal conversion layer 81 provided in the first region A.

As illustrated in FIG. 2A, for example, the thermal conversion layers 81 are formed as planar circular dots that are randomly disposed (dot-like pattern).

Figure 2B:
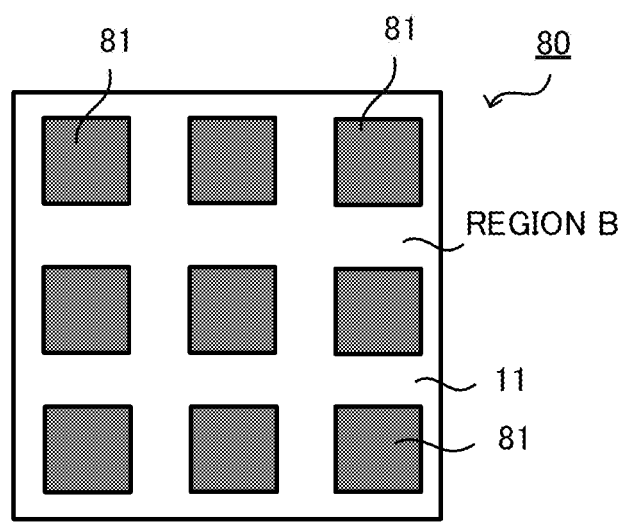
FIG. 2B is a plan view illustrating another thermal conversion layer.

The planar shape of the thermal conversion layer 81 is not limited to a circle and may have a freely selected shape. For example, the thermal conversion layer 81 may have a square shape as illustrated in FIG. 2B, or may have another geometric shape such as a triangle. The planar shapes of the thermal conversion layers 81 may all be the same, or at least some may have a different shape. The thermal conversion layers 81 may be randomly disposed as illustrated in FIG. 2A, or may be regularly disposed as illustrated in FIG. 2B. Moreover, the thermal conversion layer 81 may partially contact an adjacent other thermal conversion layer 81.

Moreover, the thermal conversion layers 81 are not limited to a dot-like pattern and may be disposed in a lattice pattern. Moreover, in FIGS. 2A and 2B, a configuration can be adopted in which the regions of providing the thermal conversion layer 81 are reversed for the first region A versus the second region B, that is to say, the thermal conversion layer 81 is formed in the second region B part, and the thermal conversion layer 81 is not formed in the first region A part. Further, the thermal conversion layer 81 may display an overall design or patterning such as an alligator skin pattern. Furthermore, the thermal conversion material may be included within the thermal conversion layer 81 in a homogeneous manner or in a non-homogeneous manner.

In the present embodiment, the height of the convexities, the spacing of formation of the convexities, or the like is controlled by shape and size of the thermal conversion layer 81 (first region A), the amount and concentration of the thermal conversion material included in the thermal conversion layer 81, the shape and size of the second region B, or the like.

Method of Manufacture of Thermally Expandable Sheet 10

Figure 3A:
FIG. 3A illustrates a thermally expandable sheet manufacturing method used in the present embodiment.

The thermally expandable sheet 10 of the present embodiment is manufactured in the manner described below. Firstly, as illustrated in FIG. 3A, the sheet-like material for forming the base 11 is prepared as a sheet of PET, for example. The base 11 may be in a roll or may be precut.

Figure 3B:
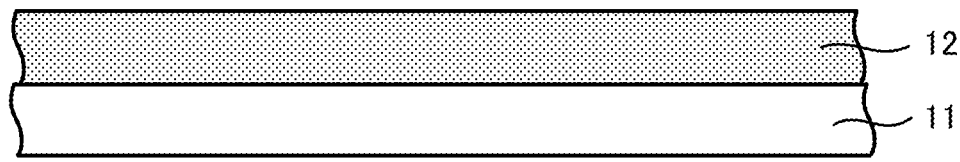
FIG. 3B further illustrates the thermally expandable sheet manufacturing method used in the present embodiment.

Next, a binder formed from a material such as a thermoplastic resin is mixed with the thermally expandable material (thermally expandable microcapsules), and a coating liquid is prepared for forming the thermal expansion layer 12. Thereafter, the coating liquid is coated onto the first surface of the base 11 by use of a widely known coating apparatus such as a bar coater, a roller coater, a spray coater, or the like. Thereafter, the coating film is dried, and the thermal expansion layer 12 as illustrated in FIG. 3B is formed. The application and drying of the coating liquid may be repeated multiple times in order to obtain the thermal expansion layer 12 of the targeted thickness. Further, the thermal expansion layer 12 may be formed using a non-coating type apparatus such as a screen printing apparatus.

Figure 3C:
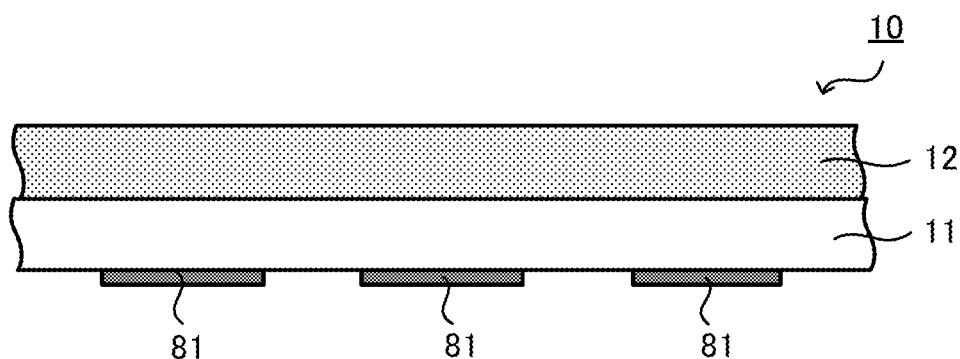
FIG. 3C further illustrates the thermally expandable sheet manufacturing method used in the present embodiment.

Thereafter, a widely known printing apparatus is used to form the thermal conversion layers 81 in the regions corresponding to the expansion region E of the second surface of the base 11 from the ink that includes the thermal conversion material. Examples of the utilized printing apparatus include an inkjet printer, an offset printing apparatus, a flexographic printing apparatus, a photogravure printing apparatus, or the like. As illustrated in FIG. 2A, the planar shape of the thermal conversion layers 81 is circular, and multiple such shapes are disposed randomly. In the case in which the base 11 is in the form of a roll, the roll may be cut as required. Thus the thermally expandable sheet 10 as illustrated in FIG. 3C is manufactured.

Shaped Object 20

Next, the shaped object 20 is described with reference to drawings. The shaped object 20 is formed by expansion of the thermal expansion layer 12 of the thermally expandable sheet 10. The shaped object 20 formed by expansion of the thermal expansion layer 12 is illustrated in FIG. 4A, and a partial cross-sectional view of the shaped object 20 is illustrated in FIG. 4B.

Figure 4A:
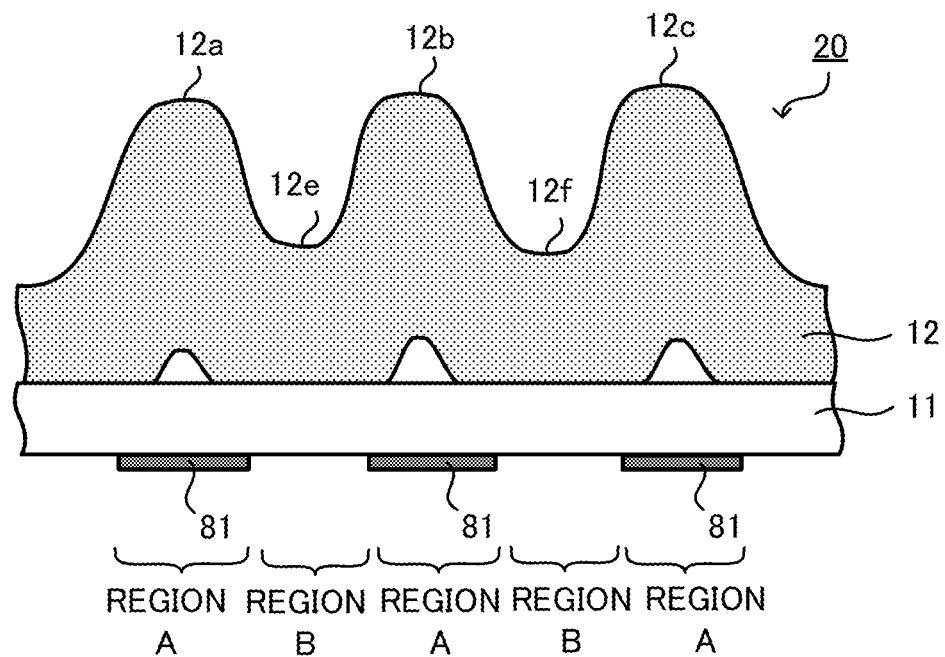
FIG. 4A is a cross-sectional view illustrating a shaped object according to the embodiment.
Figure 4B:
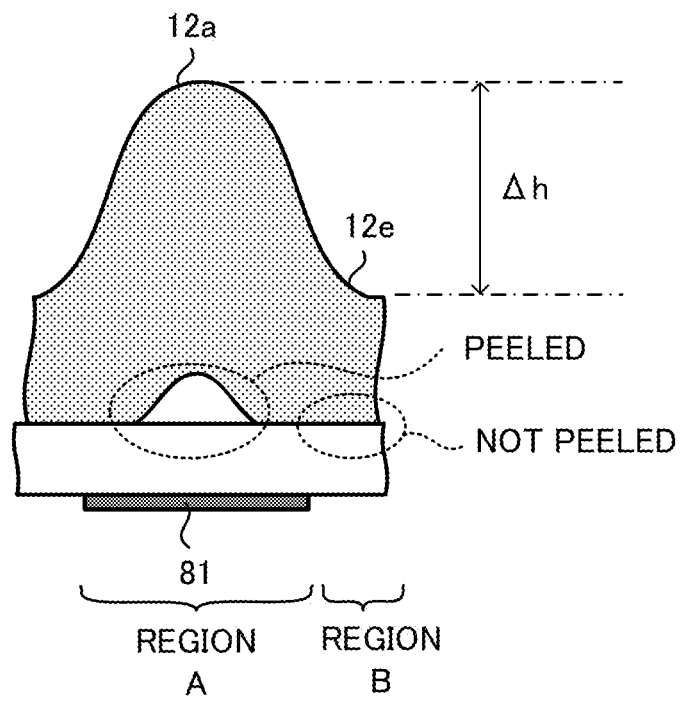
FIG. 4B is a partial cross-sectional view of the shaped object according to the embodiment.

As illustrated in FIG. 4A, convexities 12a, 12b, and 12c are formed in the thermal expansion layer 12 of the shaped object 20. The convexities 12a, 12b, and 12c are formed respectively in regions (first regions A) where the thermal conversion layers 81 are provided. Moreover, concavities are provided between adjacent convexities. In FIG. 4A, the concavity 12e is formed between the convexity 12a and the convexity 12b, and the concavity 12f is formed between the convexity 12b and the convexity 12c. Although the parts where the concavities 12e and 12f are formed are second region B parts where the thermal conversion layer 81 is not provided, in the present embodiment, the concavities 12e and 12f are swollen by expansion in comparison to prior to swelling of the thermal expansion layer 12.

Moreover, in the present embodiment, under each of the convexities 12a, 12b, and 12c, the thermal expansion layer 12 is partially peeled away from the base 11. Specifically, as illustrated in FIG. 4B, the thermal expansion layer 12 is partially peeled from the base 11 under the convexity 12a. In this manner, for convexities at which swelling to a greater height is desired, the part of the thermal expansion layer 12 opposing the base 11 can be made to peel away from the base 11 so that the expansion layer 12 expands to a higher extent. However, under the concavity 12e, unlike under the convexity 12a, the thermal expansion layer 12 is not made to peel away from the base 11. Due to lack of formation of the thermal conversion layer 81, in the second region B, the height of swelling of the thermal expansion layer 12 occurring in the first region A can be relatively suppressed. Due to such processing, a difference in height Δh between the convexity 12a and the concavity 12e illustrated in FIG. 4B can be made larger in comparison to conventional processing. Moreover, due to disposal of such a second region B between the first regions A, the region of peeling of the thermal expansion layer 12 from the base 11 can be suppressed, and the peeling of the entire thermal expansion layer 12 from the base 11 in the expansion region E can be suppressed. Furthermore, in comparison to conventional operation, the thermal expansion layer 12 can be made to highly expand, and thus the thermal expansion layer 12 can be equipped with cushioning ability.

Moreover, the thermal expansion layer 12 in the first region A highly expands to the extent that peeling from the base 11 occurs, and thus a shape does not arise such that adjacent convexities interconnect and there is no formation of a distinct concavity 12e such as that illustrated in FIG. 4A. Moreover, in the case of interconnection of adjacent convexities, even in the second region B part, the thermal expansion layer 12 sometimes has a height equivalent to that of the first region A part.

In the case in which multiple thermal conversion layers 81 are formed as illustrated in FIG. 1C, the thermal expansion layer 12 occurring in the first region A sometimes is present in a non-peeling region despite complete peeling from the base. In the same manner, the thermal expansion layer 12 occurring in the second region B is not limited to entirely not peeling form the base 11, and the peeling occurring in the first region A may sometimes reach a part of the second region B.

Further, the shaped object 20 may be provided with a non-illustrated color ink layer on at least one of the surfaces (front surface or back surface illustrated in FIG. 4A) of the shaped object 20. The color ink layer is a layer formed from ink using a freely selected printing apparatus such as an offset printing apparatus or a flexographic printing apparatus. The color ink layer may be formed from a water-based ink, an oil-based ink, an ultraviolet-curing type ink, or the like. Moreover, the color ink layer expresses a desired image such as characters, numbers, photographs, patterns, or the like. When the color ink layer is formed using a water-based ink jet printer, an ink receiving layer is preferably provided that receives the ink on the surface where the color ink layer is formed, and then the color ink layer is formed. Additionally, although the color ink layer, depending on factors such as the printed image, might not form a distinct layer, the expression "layer" is used in the present description for ease of description.

In the present embodiment, the thermal conversion layer 81 is disposed such that at least a part thereof is located separately from an adjacent other thermal conversion layer 81, and the second region B, in which the thermal conversion layer 81 is not formed, is provided between the thermal conversion layers 81. In addition, due to expansion, the thermal expansion layer 12 occurring in the first region A swells and partially peels from the base 11 in the first region A. However, although the thermal expansion layer 12 in the second region B also swells due to expansion, the degree of expansion of the thermally expandable material in the second region B is suppressed in comparison to the first region A. By the thermal expansion layer 12 in this manner controlling the region of peeling from the base 11, even in the case of expansion of the thermal expansion layer 12 over the entire expansion region E, the entire peeling of the thermal expansion layer 12 from the base 11 can be suppressed. Due to such operation, peeling of the entire thermal expansion layer 12 can be prevented. Further, due to swelling of the thermal expansion layer 12 in the first region A to a degree that causes partial peeling from the base 11, the protrusion formed in the first region A can be heightened. This has the effect of enabling the shaped object 20 to have good unevennesses in the surface thereof.

The shaped object 20 can have multiple protrusions on the surface, and the protrusions of the shaped object 20 can be heightened. Also, the thermal expansion layer 12 can be equipped with cushioning ability. This type of shaped object 20 can obtain sound absorbance by suppression of sound propagation or the like. Thus the shaped object 20 can be used as a soundproof sheet. In this case, the thermal expansion layer 12 functions as a soundproof layer.

In addition, the shaped object 20 has parts where the thermal expansion layer 12 peels from the base 11 and parts without peeling from the base 11. In the parts where the thermal expansion layer 12 peels away from the base 11, a space arises between the thermal expansion layer 12 and the base 11. Therefore the surface of the thermal expansion layer 12 opposing the base 11 differs for the parts where peeling from the base 11 occurs versus the parts without peeling. Thus differences in light dispersion arise between the parts where peeling of the thermal expansion layer 12 from the base 11 occurs and the parts without peeling. This difference can be used to enable the shaped object 20 to be used as a lampshade.

Method of Manufacture of Shaped Object 20

Next, the method of manufacture of the shaped object 20 using the thermally expandable sheet 10 is described. Although a sheet-type example is described in the shaped object manufacturing method described below, a thermally expandable sheet 10 may be used in the form of a wound roll.

Figure 5:
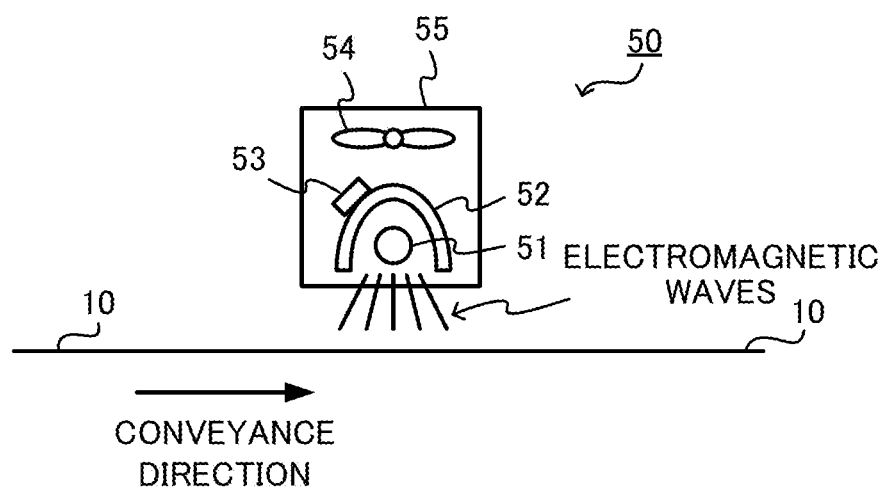
FIG. 5 illustrates an expansion apparatus.

Firstly, an expansion apparatus 50 used to expand the thermal expansion layer 12 of the thermally expandable sheet 10 is described. As illustrated in FIG. 5, the expansion apparatus 50 is equipped with components such as an irradiation unit 51 that has a lamp heater, a reflection plate 52 that reflects the electromagnetic waves emitted from the irradiation unit 51 toward the thermally expandable sheet 10, a temperature sensor 53 that measures the temperature of the reflection plate 52, and a cooler 54 that cools the interior of the expansion unit 50, a pair of conveying rollers that hold therebetween the thermally expandable sheet 10 for conveyance along a conveyance guide, and a conveying motor for rotating the pair of conveying rollers. Moreover, the irradiation unit 51, the reflection plate 52, the temperature sensor 53, and the cooler 54 are housed within a housing 55. The pair of conveying rollers convey the thermally expandable sheet 10 underneath the irradiation unit 51.

The lamp heater, for example, includes a halogen lamp, and the lamp heater irradiates the thermally expandable sheet 10 with the electromagnetic waves (light) in the near-infrared region (750 to 1,400 nm wavelength range), the visible light region (380 to 750 nm wavelength range), or the intermediate infrared region (1,400 to 4,000 nm wavelength range). The irradiation unit 51 is not limited to a halogen lamp, and a different configuration may be used as long as irradiation with the electromagnetic waves is possible. Moreover, the wavelength of the electromagnetic waves is not limited to the aforementioned ranges.

Figure 6A:
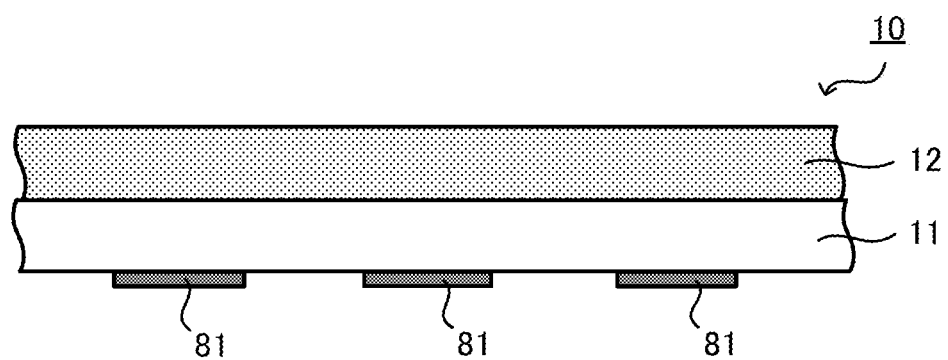
FIG. 6A is a cross-sectional view illustrating schematically a shaped object manufacturing method according to the embodiment.

The thermally expandable sheet 10 printed with the thermal conversion layers 81 illustrated in FIG. 6A is conveyed toward the expansion apparatus 50 with the back surface facing upward.

At the expansion apparatus 50, the irradiation unit 51 irradiates the back surface of the thermally expandable sheet 10 with the electromagnetic waves. During irradiation with the electromagnetic waves, irradiation is performed for the entire expansion region E'. In the present embodiment, the expansion region E is nearly the entire thermally expandable sheet 10, and thus the entire thermally expandable sheet 10 is irradiated with the electromagnetic waves. In the parts where the thermal conversion layers 81 are formed, the electromagnetic waves are converted to heat with greater efficiency in comparison to the parts that are not equipped with the thermal conversion layers 81. Thus within the thermally expandable sheet 10, parts where the thermal conversion layers 81 are formed are mainly heated, and the thermally expandable material expands upon reaching the temperature of initiation of expansion. Moreover, in the present embodiment, the irradiation with the electromagnetic waves is performed such that the heat generated in the thermal conversion layers 81 is transmitted also to the thermal expansion layer 12 in the second region B where the thermal conversion layers 81 are not provided.

Figure 6B:
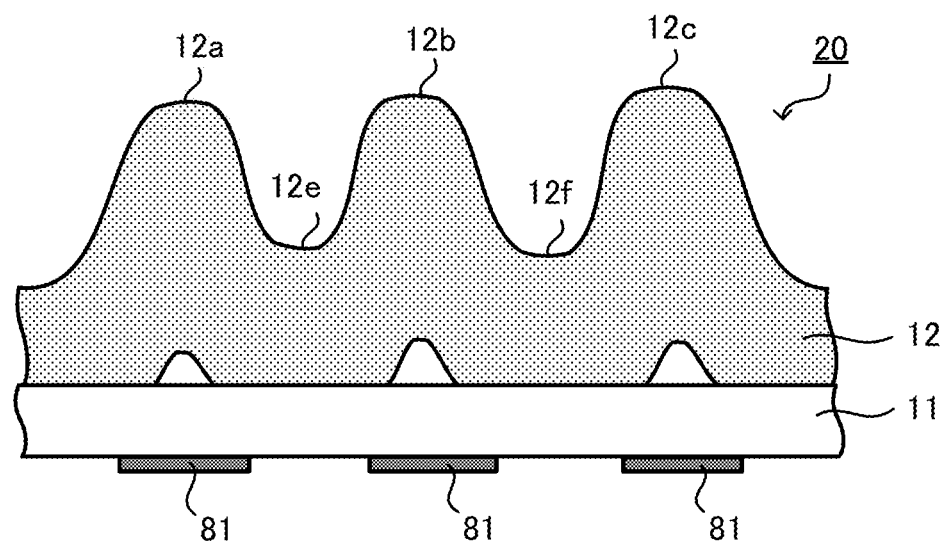
FIG. 6B is a cross-sectional view further illustrating schematically the shaped object manufacturing method according to the embodiment.

As a result, the thermal expansion layer 12 in the first region A expands, and the convexities 12a, 12b, and 12c are formed as illustrated in FIG. 6B. At this time, beneath the convexities 12a, 12b, and 12c, the thermal expansion layer 12 expands such that a part thereof peels away from the base 11. Moreover, although the thermal expansion layer 12 swells due to expansion also in the second region B, the degree of heating is suppressed in comparison to the first region A, and thus the concavities 12e and 12f are formed, and the thermal expansion layer 12 does not peel from the base 11 in the second region B. Thus even when the entire thermal expansion layer 12 is highly expanded and the thermal expansion layer 12 in the first region A peels away from the base 11, the peeling of the thermal expansion layer 12 from the base 11 in the second region B can be suppressed. Thus entire peeling of the thermal expansion layer 12 from the base 11 in the expansion region E can be suppressed. In addition, the convexities 12a, 12b, and 12c of the thermal expansion layer 12 can be more highly expanded, and a good unevenness shape can be formed in the surface of the thermal expansion layer 12.

The shaped object 20 is manufactured by the above type of procedure.

In the present embodiment, at least a part of the thermal conversion layer 81 is disposed separately from the adjacent other thermal conversion layer 81, and between the thermal conversion layers 81, the second region B is provided where the thermal conversion layer 81 is not formed. In addition, in the first region A provided with the thermal conversion layer 81, part of the thermal expansion layer 12 is expanded so as to peel away from the base 11, and although the thermal expansion layer 12 in the second region B also expands, the peeling away of the thermal expansion layer 12 after expansion is suppressed in the second region B. Thus even in the case in which the thermal expansion layer 12 is expanded in the entire expansion region E, the manufacturing method of the shaped object 20 of the present embodiment enables suppression of peeling away of the thermal expansion layer 12 as a whole from the base 11. Also, in the first region A, the thermal expansion layer 12 can be highly expanded, and thus a good unevenness shape can be formed in the surface of the thermal expansion layer 12. Expansion of the thermal expansion layer 12 can be high in comparison to a conventional type, and thus the thermal expansion layer 12 can be equipped with cushioning ability.

This embodiment are not limited to the above-described embodiment, and various modifications and applications are possible. For example, the thermal conversion member 80 that has the thermal conversion layers 81 may be formed on the front-side surface of the thermally expandable sheet 10, or may be formed on the front side and the back side. In the case of formation on the front-side surface of the thermally expandable sheet 10, the region corresponding to the expansion region E is the expansion region E, and thus the thermal conversion layers 81 are dispersedly disposed within the expansion region E illustrated in FIG. 1B. Moreover, the case in which the surface on which the thermal conversion layer 81 is formed is irradiated with the electromagnetic waves is not limiting, and the electromagnetic waves may be irradiated on the side opposite to the surface on which the thermal conversion layer 81 is formed. The case in which the thermal expansion layer 12 is provided on the entire first surface of the base 11 is not limiting, and the formation may be on a part of the first surface of the base 11 as long as formation occurs at least in the expansion region E.

Moreover, direct formation of the thermal conversion layer 81 on the thermally expandable sheet 10 is not limiting, and such formation may be through an intermediary such as a film.

Moreover, the expansion apparatus 50 is not limited to a stand-alone configuration. For example, use is possible in a forming system equipped with a control unit, a printing unit, a display unit, or the like in addition to the expansion apparatus 50. The control unit is equipped with parts such as a controller that has components such as a central processing unit (CPU), and controls the expansion apparatus 50, the print unit, the display unit, or the like. The print unit is a widely known printing apparatus such as an inkjet printer. The display unit is a liquid crystal panel, a touch panel, or the like.

In the above-described embodiments, during the manufacture of the shaped object 20, although the case is cited in which the thermally expandable sheet 10 provided with the thermal conversion layers 81 is used, such use is not limiting. For example, in the shaped object 20 manufacturing method, a thermally expandable sheet may be used that is not equipped with the thermal conversion layer 81 (that has the base 11 and the thermal expansion layer 12). In the shaped object manufacturing method in this case, in addition to the step of forming the thermal conversion layer 81 as described in the thermally expandable sheet manufacturing method, the expansion step mentioned in the embodiments is thereafter performed.

Moreover, the drawings used in the various embodiments are each used for description of the embodiments. Thus there is no intent for ratios of thicknesses of the various formed layers of the thermally expandable sheet to be construed as being limited to the ratios illustrated in the drawings. Moreover, in the drawings used in the various embodiments, thickness of the thermal conversion layer or the like that is provided on the thermally expandable sheet is emphasized for the sake of description. Accordingly, the ratios of the thicknesses at which the heat conversion layer or the like is formed are not intended to be construed as limiting.

The foregoing describes some example embodiments for explanatory purposes.

Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A shaped object comprising:
a thermally expandable sheet comprising (i) a base, (ii) a thermal expansion layer disposed on a first surface of the base and including a thermally expandable material, and (iii) a thermal conversion member disposed on at least one of a second surface of the base or the thermal expansion layer, and including a thermal conversion material for conversion of electromagnetic waves into heat, wherein
the thermal conversion member further includes thermal conversion layers disposed on an entire region corresponding to an expansion region for expansion of the thermal expansion layer,
at least part of one of the thermal conversion layers is disposed at a location separated from an adjacent other thermal conversion layer, and
upon expansion of the thermal expansion layer, (i) the thermal expansion layer partially peels away from the base in a region where the thermal conversion layer is disposed, and (ii) the thermal expansion layer also expands in a region between the one thermal conversion layer and the other thermal conversion layer.

2. The shaped object according to claim 1, wherein the thermal conversion layers are disposed in a dot-like pattern or a lattice pattern.

3. The shaped object according to claim 1, wherein a planar shape of each of the thermal conversion layers is the same.

4. The shaped object according to claim 1, wherein a planar shape of at least some of the thermal conversion layers is different from a planar shape of other thermal conversion layers.

5. The shaped object according to claim 2, wherein the thermal conversion layers are randomly or regularly disposed.

6. The shaped object according to claim 1, wherein the base is a resin sheet.

7. The shaped object according to claim 1, wherein the thermally expandable sheet further comprises a color ink layer on the thermal expansion layer or the second surface of the base.

8. A shaped object manufacturing method comprising:
irradiating a thermally expandable sheet with electromagnetic waves to expand a thermal expansion layer, the thermally expandable sheet comprising a thermal conversion member comprising (i) a base, (ii) the thermal expansion layer disposed on a first surface of the base and including a thermally expandable material, and (iii) a thermal conversion material disposed on at least one of a second surface of the base or the thermal expansion layer for conversion of the electromagnetic waves to heat, the thermal conversion member further including thermal conversion layers disposed on an entire region corresponding to an expansion region for expansion of the thermal expansion layer, and at least part of one of the thermal conversion layers is disposed at a location separated from an adjacent other thermal conversion layer; and
upon expansion of the thermal expansion layer, (i) partial peeling away of the thermal expansion layer from the base in a region where the thermal conversion layer is disposed, and (ii) expanding also of the thermal expansion layer in a region between the one thermal conversion layer and the other thermal conversion layer.

9. The shaped object manufacturing method according to claim 8, wherein the thermal conversion layers are disposed in a dot-like pattern or a lattice pattern.

10. The shaped object manufactured method according to claim 8, wherein a planar shape of each of the thermal conversion layers is the same.

11. The shaped object manufactured method according to claim 8, wherein a planar shape of at least some of the thermal conversion layers is different from a planar shape of other thermal conversion layers.

12. The shaped object manufactured method according to claim 9, wherein the thermal conversion layers are randomly or regularly disposed.

13. The shaped object manufactured method according to claim 8, wherein the base is a resin sheet.

14. The shaped object manufactured method according to claim 8, wherein the thermally expandable sheet further comprises a color ink layer on the thermal expansion layer or the second surface of the base.

* * * * *